UNITED STATES PATENT OFFICE.

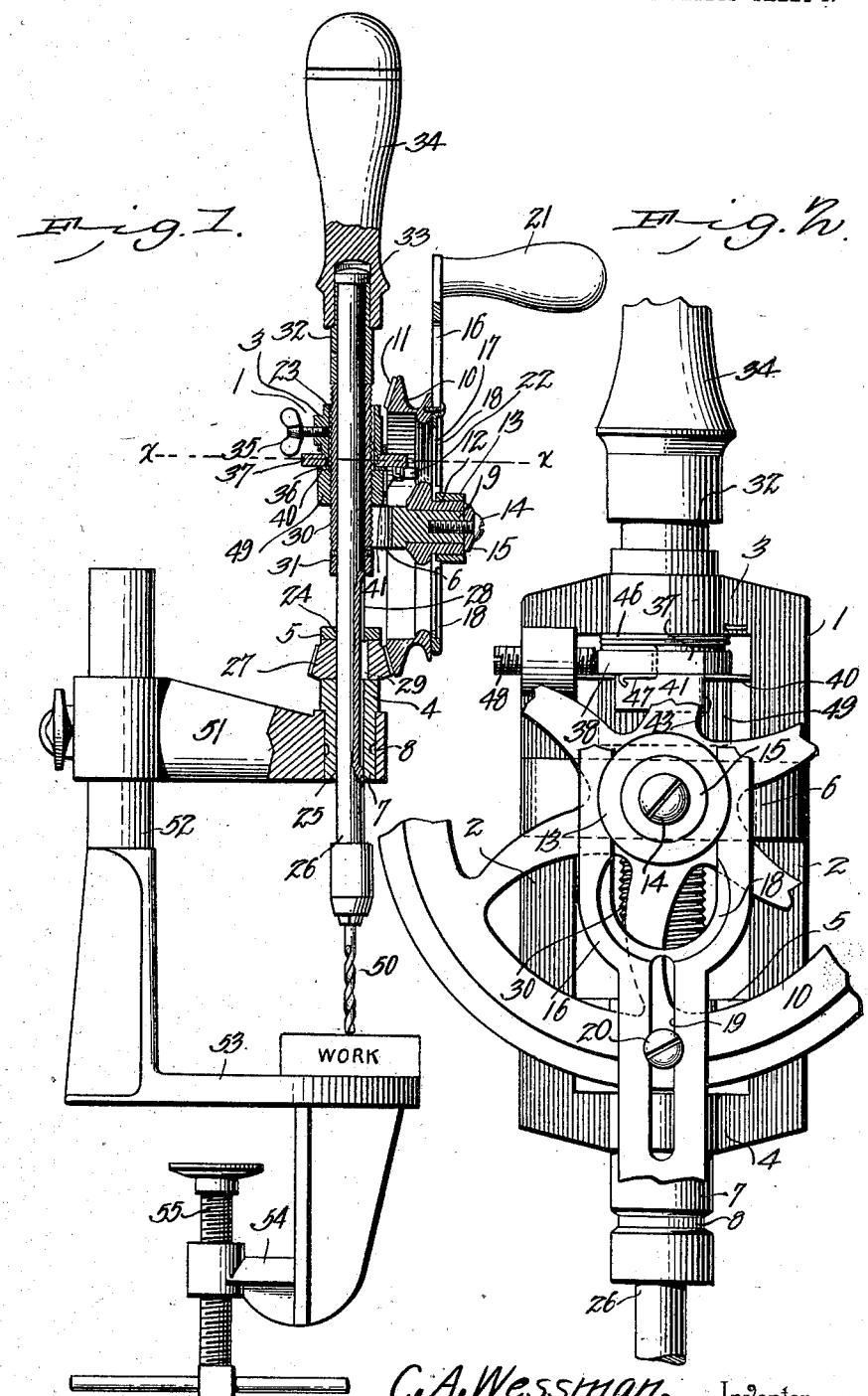

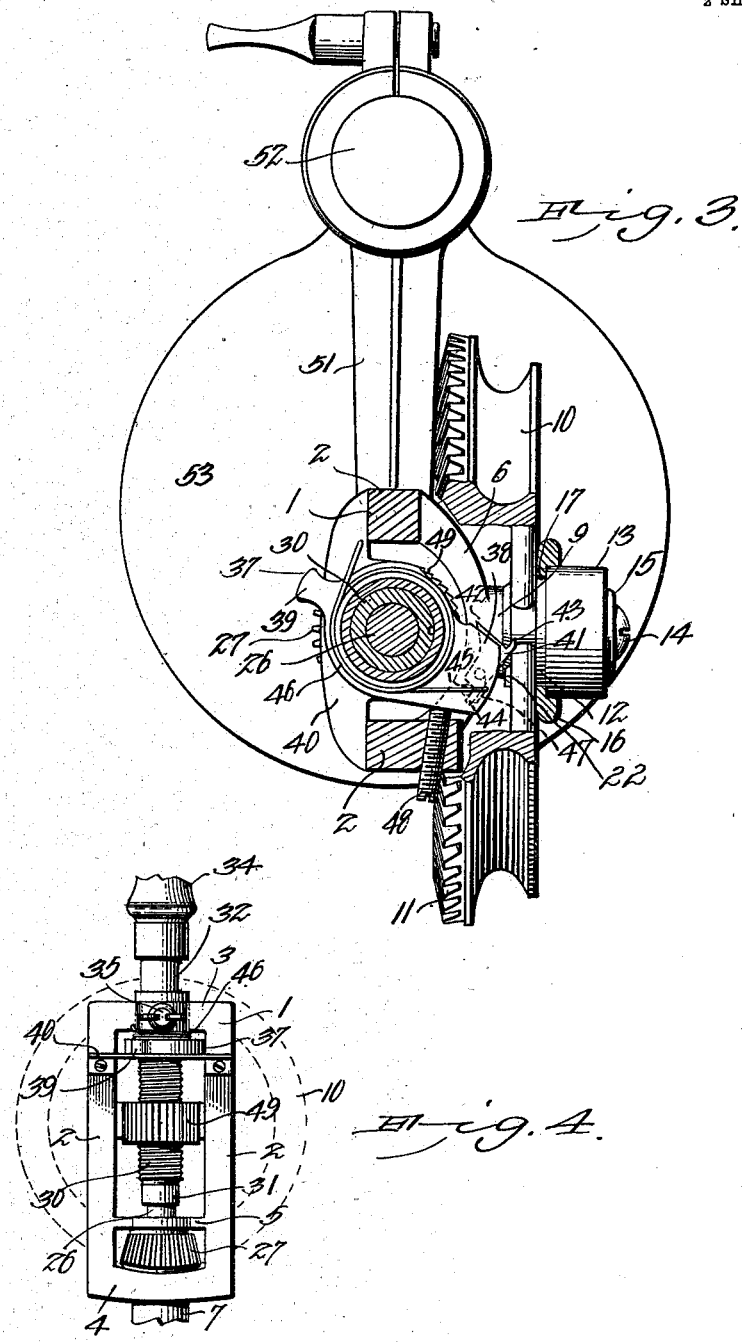

CARL A. WESSMAN, OF ROCKFORD, ILLINOIS.

DRILL.

SPECIFICATION forming part of Letters Patent No. 723,697, dated March 17, 1903.

Application filed July 30, 1902. Serial No. 117,721. (No model.)

*To all whom it may concern:*

Be it known that I, CARL A. WESSMAN, a citizen of the United States, residing at Rockford, in the county of Winnebago and State of Illinois, have invented a new and useful Drill, of which the following is a specification.

My invention is an improved drill adapted for use at will either as a bench-drill or as a hand-drill; and it consists in the peculiar construction and combination of devices hereinafter fully set forth and claimed.

In the accompanying drawings, Figure 1 is partly an elevation and partly a sectional view of my improved drill, showing the same adapted for use as a bench-drill. Fig. 2 is a detail elevation of the same at right angles to the plane of Fig. 1. Fig. 3 is partly a top plan view and partly a horizontal sectional view on a plane indicated by the line $x\,x$ of Fig. 1. Fig. 4 is a detail elevation showing the drill arranged for use as a hand-drill.

In the embodiment of my invention I provide a frame 1, which may be of any suitable form and construction. As here shown, it comprises parallel side bars 2, heads 3 4, connecting them together at their upper and lower ends, respectively, a cross-bar 5, which connects the bars 2 together and is disposed at a suitable distance above the lower head 4, and a cross-bar 6, which connects the side bars together at a suitable distance below the upper head 3 and is on one side of and curved outwardly from the bars 2, as shown in Fig. 3. The lower head 4 is formed or provided with a depending spindle 7, which has an annular circumferential oil-groove 8. The bar 6 is provided at its outer side at its center with an outwardly-extending spindle 9, on which is journaled a wheel 10, which has beveled cogs 11 on its inner side. The said wheel is formed with a hub 12, which is exteriorly screw-threaded on the outer side of the wheel, and on the said threaded hub is screwed a lock-nut 13, which is circular in form, so that its outer side or periphery is concentric with the spindle 9. A headed screw 14, which enters the threaded opening in the outer portion of the spindle, and a washer 15, which bears against the outer end of the spindle and the outer end of the hub 12, secure the wheel 10 on the spindle, as will be understood. An adjustable crank-arm 16 lies against the outer side of the wheel 10 and has its inner portion provided with a longitudinal slot 17, of suitable length and of such width as to clear the hub of the said wheel. At the ends and intermediate the ends of the said slot are segmental recesses 18 in the outer side of the crank-arm. The radius of the said segmental recesses corresponds to that of the lock-nut 13. The slot 17 enables the crank-arm to be adjusted so that its outer end may be extended to any desired distance beyond the wheel 10, and the lock-nut 13 and segmental recesses 18 coact to lock the said crank-arm when the same is adjusted, as will be understood. The crank-arm is also here shown as provided with a slot 19, the axis of which is coincident with that of the slot 17, and in the said slot 19 is a headed screw 20, which engages the wheel 10 and by means of which the arm may be adjusted. At the outer end of the crank-arm 16 is a handle 21, by which it may be turned to rotate the wheel 10. The latter is provided on its inner side at a suitable point with a tappet 22, for a purpose hereinafter described.

The upper head 3 of the frame 1 is provided with a central opening 23, the axis of which is coincident with that of openings 24 25, which are made in the cross-arm 5 and lower head 4 and spindle 7. The openings or bores 24 25 are of like diameter and of less diameter than the bore or opening 23. A spindle 26 passes through the openings 23, 24, and 25, is of such diameter as to snugly fit in the openings 24 25, and the said spindle is adapted to be rotated and to be moved longitudinally. On the spindle between the lower head 4 and the cross-bar 5 is a pinion 27. The same is engaged and may be rotated by the wheel 10 and is feathered or splined to the spindle 26. The latter is here shown as provided with a longitudinal groove 28 in one side, which groove is engaged by a spline 29 in the pinion. Hence the spindle is revoluble with the pinion and is movable longitudinally therethrough. On the spindle above the bar 5 is a screw-sleeve 30, of suitable length, which is revoluble freely on the spindle and has its screw-thread on its outer side. A flange or collar 31 is secured to or formed with the spindle and bears under the lower end of the screw-sleeve. A sleeve 32 revolves freely on the upper portion of the spindle and bears against the upper end of the screw-sleeve. The spindle is here shown as provided with a flanged head 33, which bears against the upper end of the sleeve 32, and thereby the latter and the screw-sleeve are swiveled on the spindle, so that they are revoluble independently thereof and of each other and are movable longitudinally therewith. A handle 34, which may be of suitable form, is secured to the upper end of the sleeve 32. The latter is of such diameter that it is adapted to fit snugly in the opening 23. The latter is not threaded. The diameter of the screw-sleeve, including its thread, is about that of the sleeve 32. Hence the screw-sleeve is adapted to move longitudinally through the opening 23 without engaging the same. When the sleeve 32 is in the opening 23, it may be secured against longitudinal movement to also secure the spindle against such movement by a set-screw 35.

The upper head 3 is formed on its inner or under side with an annular sleeve 36, which is concentric with the spindle 26 and on which an oscillating member 37 has its bearing. The said oscillating member has oppositely-extending arms 38 39, the arm 38 carrying the means by which it is automatically operated when said means are engaged by actuating mechanism, hereinafter to be described, and the arm 39 is adapted to be used by hand for oscillating the member 37 when the automatic mechanism is out of gear and it is so desired to operate said member. A plate or bracket 40 is here shown as secured to the arms 2 of the frame 1 and as bearing under the oscillating member 37 to maintain the latter on its bearing 36 and prevent it from slipping therefrom. A pawl 41 is pivoted to the under side of the arm 38 of oscillating member 37 and has an engaging point 42, an outwardly-extending tappet-arm 43, and a stop-arm 44. The latter coacts with a stop 45, with which the arm 38 is provided, to limit the outward movement of the free or engaging end of the pawl. A spring 46, which is here shown as a coiled spring, but which may be of any suitable construction, moves the oscillatory member 37 in one direction. A spring 47 bears against the pawl to normally move the engaging end thereof outwardly and dispose the tappet 43 thereof in the path of the tappet 22 on the inner side of the wheel 10. An adjusting-screw 48 forms a stop which coacts with the arm 38 of the oscillating member to limit the movement thereof in one direction by the tension of the spring 46, and by means of the said adjusting-screw the stroke or limit of motion of the oscillating member may be regulated, as will be understood. A ratchet-wheel 49 is interiorly screw-threaded and is screwed on the sleeve 30. Hence the ratchet-wheel is adapted to rotate on the screw-sleeve and to traverse the same from end to end and to coact therewith to feed or move the spindle 26 longitudinally, as will be understood. The drill-bit 50 is carried by the spindle 26.

In Fig. 1 of the drawings I show the set-screw 35 disengaged from the sleeve 32 and the spindle, together with the sleeves 32 30, to run up to such an extent as to cause the ratchet-wheel 49 to bear directly under the plate or bracket 40 and to be disposed in position to be engaged by the pawl 41. The spindle 8 of the frame 1 is shown engaged in a bearing at the outer end of an arm 51 vertically adjustable on a spindle 52 with which a bed or table 53 is provided and on which (the bed or table) the work is placed, which is engaged by the point of the drill-bit. The said bed or table is shown as provided on its under side with a clamp-arm 54 and screws 55, by which it may be secured on a bench. Hence the drill is shown disposed for operation as a bench-drill. On revolving the wheel 10 by means of the crank-arm 16 and handle 21 the spindle 26 is caused to rotate to operate the drill-bit. At each rotation of the wheel 10 its tappet 22 engages the tappet 43 of the pawl 41, moving the latter inwardly to engage its point 42 with a tooth of the ratchet-wheel 49. The angle between the point 42 and tappet 43 of the pawl is sufficiently wide to keep the arm 43 in engagement with the ratchet-wheel during a partial rotation of the wheel 10, and thereby cause the oscillating member 37 and the pawl 31 to move, with the tappet 22 of the wheel, against the tension of the spring 46, and thereby cause the pawl to partly turn the ratchet-wheel at each rotation of the wheel 10, and thereby by reason of the engagement of the ratchet-wheel with the screw-sleeve 30 automatically to feed the drill-bit to the work. The throw of the oscillating member may be regulated by adjusting the screw 48, as hereinbefore stated, and hence the drill spindle and bit may be fed at each rotation of the wheel 10 to the extent required by the nature of the work. When it is not desired to feed the drill-spindle automatically, the sleeve 32 is locked in the head 30 by the set-screw 35 and the ratchet-wheel run downward or outwardly on the screw-sleeve a sufficient distance to prevent it being engaged by the pawl 41. The wheel 10 being then turned, the drill-spindle and the bit carried thereby will be revolved by the engagement of the pinion 27 by the wheel 10; but the drill-spindle must be fed to the work by the pressure of the operator on the handle 34. The drill may be thus used either when mounted on the support 51 or when disconnected therefrom. By employing a suitable head in lieu of the handle 34 the drill may be used as a breast-drill, as will be understood.

Having thus described my invention, I claim—

1. In a drill, the combination of a frame, a drill-spindle, a feeding element for the drill-spindle, a ratchet-wheel operatively connected with the feeding element, oscillating and yielding means for moving said feed element in one direction, a pawl carried by the oscillating member, a spring to normally hold the pawl out of engagement with the ratchet-wheel, and a revoluble drill-operating member having a tappet to engage the pawl with the ratchet.

2. In a drill, the combination of a frame, a drill-spindle revoluble and longitudinally movable therein, a feed-screw sleeve on said spindle, revoluble independently thereof and movable longitudinally therewith, a ratchet-wheel having a threaded bore engaging the feed-screw sleeve, an oscillating member, a spring to move the same in one direction, a pawl carried by the oscillating member, a spring to normally disengage the pawl from the ratchet-wheel, a pinion revoluble with and in which the spindle is longitudinally movable, a power-wheel geared to said pinion and having a tappet to engage the pawl with the ratchet, and move the oscillating member and pawl in one direction at each rotation of the power-wheel, and means to regulate the throw of the oscillating member, substantially as described.

3. In a drill, the combination of a frame, a drill-spindle revoluble and longitudinally movable therein, a feed-screw sleeve on said spindle, revoluble independently thereof and movable longitudinally therewith, a ratchet-wheel having a threaded bore engaging the feed-screw sleeve, a power-wheel geared to the drill-spindle to rotate the same, and a pawl intermittently engaged with the ratchet-wheel by the power-wheel, and moved with the latter in one direction, to partly turn the ratchet-wheel on the feed-screw sleeve, at each rotation of the power-wheel, substantially as described.

4. A convertible bench and hand drill comprising a frame, a drill-spindle revoluble and longitudinally movable therein, means to rotate said spindle, a feed mechanism therefor including a step-by-step mechanism, operated by the spindle-revolving means, and means to lock the spindle against longitudinal movement and throw the step-by-step mechanism out of gear without affecting the operation of the spindle-revolving means, substantially as described.

5. A convertible bench and hand drill comprising a frame, a drill-spindle mounted for longitudinal movement and rotation therein, a feed-screw sleeve loose on the spindle and movable longitudinally therewith, a pinion revoluble with the spindle and in which the latter is longitudinally movable, a power-wheel geared to the pinion, a ratchet-wheel having a threaded bore engaged by the feed-screw sleeve, an oscillating member, pivotally connected to the frame, a spring to move said member in one direction, a pawl carried by said oscillating member, a spring, normally disengaging said pawl from the ratchet-wheel, a tappet carried by the power-wheel, to intermittently engage the pawl with the ratchet-wheel and turn the same and the oscillating member a partial rotation in one direction, to feed the drill-spindle automatically, and means to lock the feed-screw sleeve against endwise movement and thereby throw the automatic feed mechanism out of gear, without affecting the capability of the power-wheel and pinion to rotate the drill-spindle, substantially as described.

In testimony that I claim the foregoing as my own I have hereto affixed my signature in the presence of two witnesses.

CARL A. WESSMAN.

Witnesses:
  CARL D. GRAHN,
  CARL JOHNSON.